June 14, 1938. A. L. FREEDLANDER ET AL 2,120,698
BELT CONNECTER
Filed Oct. 28, 1935 2 Sheets-Sheet 1
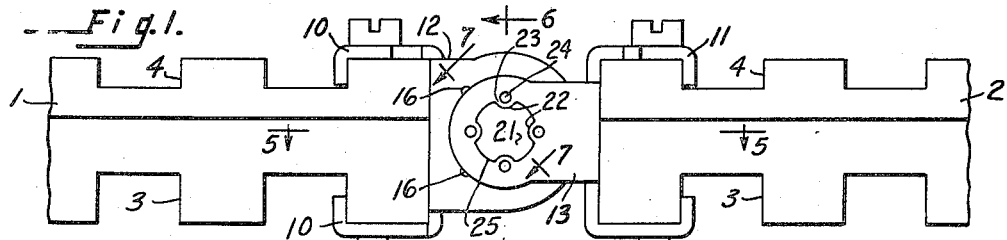
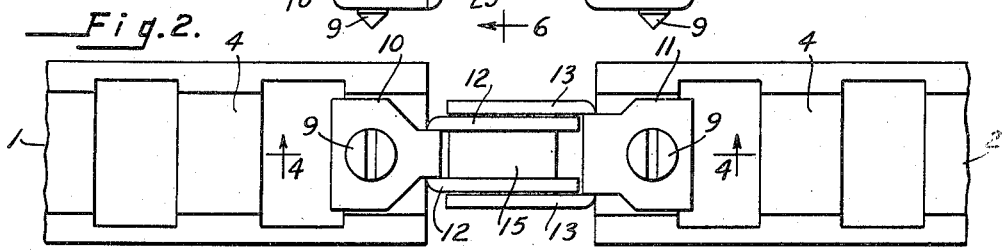
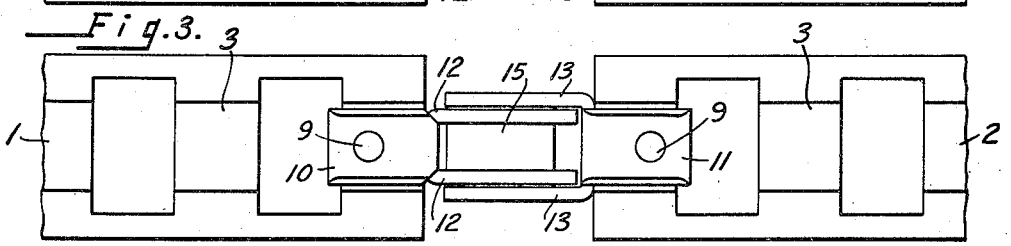
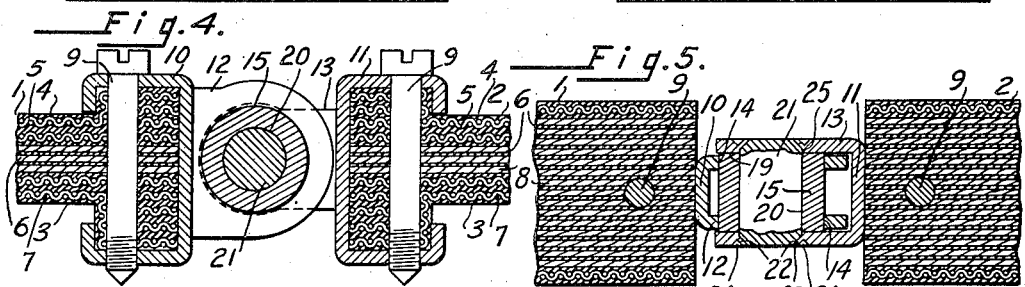
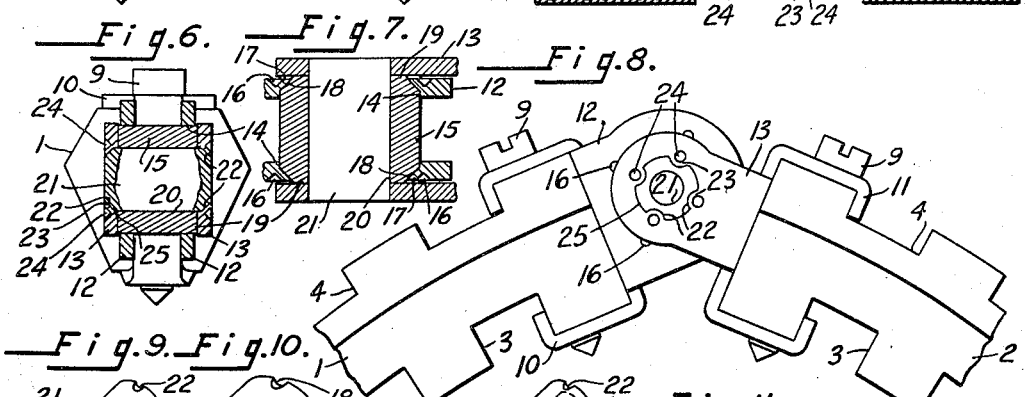
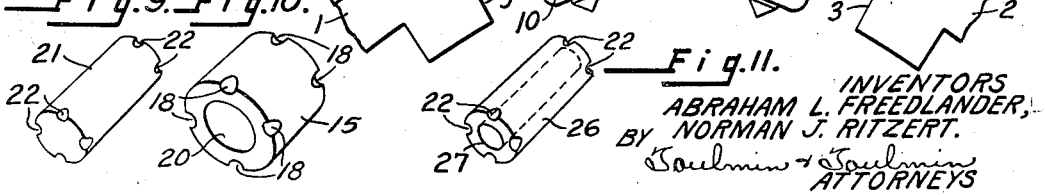
INVENTORS
ABRAHAM L. FREEDLANDER,
NORMAN J. RITZERT.
BY Toulmin & Toulmin
ATTORNEYS

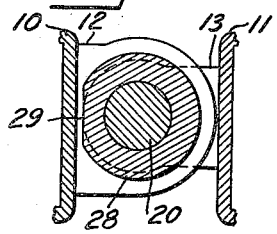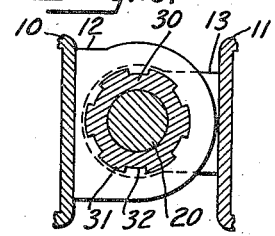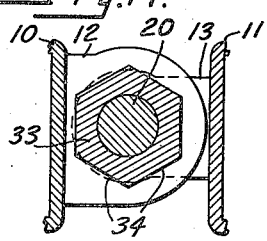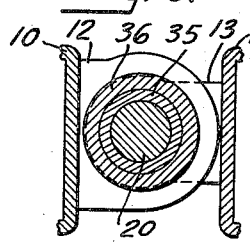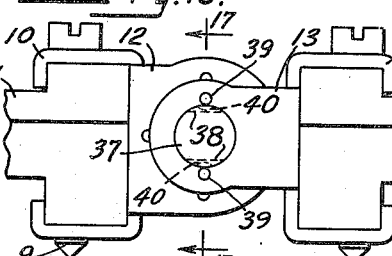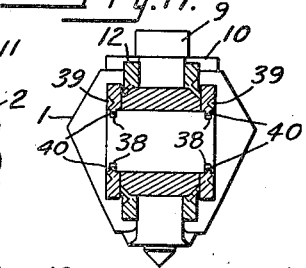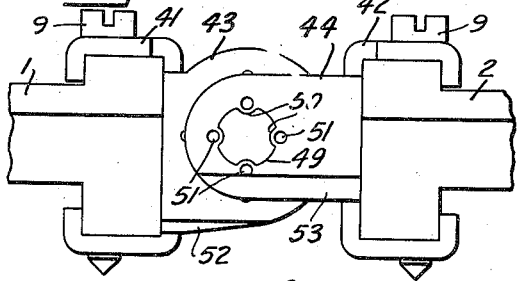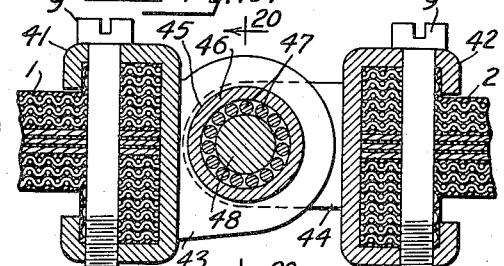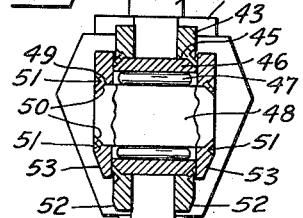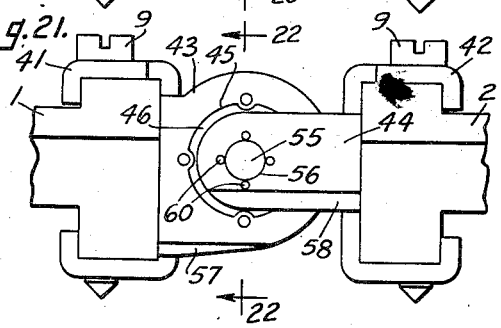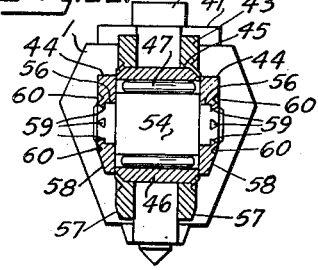

Patented June 14, 1938

2,120,698

UNITED STATES PATENT OFFICE 2,120,698

BELT CONNECTER

Abraham L. Freedlander and Norman J. Ritzert, Dayton, Ohio, assignors to The Dayton Rubber Mfg. Company, Dayton, Ohio, a corporation of Ohio Application October 28, 1935, Serial No. 47,014

3 Claims. (Cl. 24—33)

This invention relates to belt connecters, and particularly to belt connecters having bearing members interposed between the ends of the belt.

One object of this invention is to provide a belt connecter containing a cylindrical bearing member and a bearing pin within this member so as to permit relative tilting of the ends of the belt.

Another object is to provide a belt connecter having a bearing member of porous construction with lubricant contained therein, this bearing member engaging a bearing pin on the opposite belt clip so as to provide tilting engagement between the opposite ends of the belt.

Another object is to provide a belt connecter having a hollow cylindrical bearing member secured to one belt clip and a bearing pin within this member, secured to the other belt clip, the bearing being preferably of the oilless type, wherein lubricant is forced into the pores of a porous metal.

Another object is to provide a belt connecter having a hollow cylindrical bearing member and a bearing pin within this member, the cylindrical bearing member being secured to one belt clip and having its ends extended outwardly beyond the belt clip so as to engage the arms of the opposite belt clip and thus provide a thrust bearing effect at that point as well as a swinging support for the bearing pin.

Another object is to provide a belt connecter having a hollow cylindrical bearing member and a bearing pin within this member, with improved means of securing the cylindrical bearing member to the belt connecter for preventing relative rotation therebetween.

Another object is to provide a belt connecter having a pair of interextending arms and an anti-friction bearing arranged between said arms, one race of said bearing being secured to one arm and the other race to the other arm.

Another object is to provide a belt connecter having a pair of arms with a needle bearing arranged between the arms, the outer race of the needle bearing being secured to one arm and the inner race comprising a bearing pin secured to the other arm.

Another object is to provide a belt connecter of the previously described types, with a hollow bearing pin for reducing the weight of the moving parts thereof.

Another object is to provide a belt connecter having a hollow cylindrical oilless bushing member and a bearing pin therein, the bushing member being surrounded by a sleeve of harder metal, this sleeve being secured to one arm of the belt connecter.

In the drawings:

Figure 1 is a side elevation of the ends of a belt interconnected by the belt connecter of this invention.

Figure 2 is a top plan view of the structure shown in Figure 1.

Figure 3 is a bottom plan view of the structure shown in Figure 1.

Figure 4 is a vertical longitudinal section along the line 4—4 of Figure 2.

Figure 5 is a horizontal section along the line 5—5 of Figure 1.

Figure 6 is a vertical cross section along the line 6—6 of Figure 1.

Figure 7 is an oblique cross section along the line 7—7 of Figure 1.

Figure 8 is a view similar to Figure 1, but showing the bearing pin of hollow construction and with the ends of the belt tilted relatively to each other.

Figure 9 is a perspective view of the bearing pin of the belt connecter.

Figure 10 is a perspective view of the bearing bushing or hollow cylindrical bearing member of this invention.

Figure 11 is a view similar to Figure 9, but showing the hollow bearing pin.

Figures 12, 13 and 14 are vertical, longitudinal sections, similar to Figure 4, but showing modified means of securing the bearing bushing to the belt connecter arm.

Figure 15 is a vertical, longitudinal section, similar to Figure 4, but showing a modified form of belt connecter having a harder metal sleeve surrounding the bearing bushing, and secured to the belt connecter arm.

Figure 16 is a side elevation of the belt connecter, similar to Figure 1, but with a modified means of securing the bearing pin to the belt connecter arm.

Figure 17 is a section along the line 17—17 of Figure 16.

Figure 18 is a side elevation of a belt connecter employing an anti-friction bearing between the respective arms.

Figure 19 is a vertical, longitudinal section through the belt connecter of Figure 18, taken in a plane similar to Figure 4.

Figure 20 is a vertical section along the line 20—20 of Figure 19.

Figure 21 is a side elevation, similar to Figure 18, but showing a modified form of belt connecter having a bearing pin with reduced end portions.

Figure 22 is a vertical section along the line 22—22 of Figure 21.

Referring to the drawings in detail, Figure 1 shows the ends 1 and 2 of a belt of approximately hexagonal cross section, having teeth 3 and 4 on the upper and lower sides thereof. The belt itself may be of any suitable construction, the type shown being of combined rubber and fabric construction. In this belt there is an upper tension section 5 (Figure 4), a middle neutral section 6 and a lower compression section 7. The neutral section 6 is provided with longitudinally extending cords 8, which prevent the belt substantially from extending in this portion.

Fastened to the ends 1 and 2 of the belt, as by the screws 9, are belt clips 10 and 11, respectively. The ends of these belt clips 10 and 11 are turned over to engage the teeth 3 and 4 of the belt so as to secure the belt connecter firmly to the belt. The belt clips 10 and 11 are provided with side arms 12 and 13, interengaging one another in the manner shown in Figures 2 and 3. The arms 12 of the clip 10 are provided with bores 14 which serve to receive a hollow cylindrical bearing bushing 15. The ends of the bearing bushing 15 are "staked" or clinched to the side arms 12 by indentations 16 made as by a prick punch, and causing a portion 17 of the middle of the arm to enter a corresponding indentation 18 in the periphery of the bearing bushing 15 (Figures 6, 7 and 10). The outer ends of the bearing bushing 15 are slightly extended beyond the arms 12, as at 19, these projections engaging the arms 13 to give a thrust bearing effect and to space the arms 12 out of contact with the arms 13.

The bearing bushing 15 is of the so-called oilless type. That is, it is permanently charged with lubricant in such a manner as to require virtually no further attention over long periods of time. To this end the bearing bushing 15 is made of a slightly porous metal, through the pores of which a lubricant is introduced and is absorbed by the porous metal. Consequently, the bearing will be properly lubricated over long periods of use without any lubricant being supplied by the operator.

The bearing bushing 15 contains a bore 20, having a diameter of a size suitable to receive the bearing pin 21. The latter passes through the bore 20 and is secured at its ends in the side arms 13, in a manner similar to the securing of the bearing bushing 15 at its ends in the side arms 12. The bearing pin 21 for this purpose is provided with indentations 22 at its end edges. Into these projections portions 23 of the side arms 13 are forced, as by making indentations 24 in the side arms immediately opposite the bearing pin indentations 22. The indentations 24 may also be made by a prick punch. When this is accomplished the bearing bushing 15 will be firmly secured to the side arms 12, with its ends slightly projecting therebeyond to engage the opposite walls of the side arms 13. At the same time the bearing pin 21 will be firmly secured within the bores 25 of the side arms 13. Rotation between these bearing members and their respective side arms is effectively prevented by the indentations previously mentioned.

In the use of the belt connecter of this invention the belt, having the ends 1 and 2, passes around the peripheries of pulleys which may be of different diameters. When this occurs the ends 1 and 2 tilt relatively to one another, yet are held firmly in engagement by the engagement of the bearing pin 21 within the bore 20 of the bearing bushing 15. At the same time the extended ends 19 of the bearing bushing 15 engage the side arms 13 and provide a thrust bearing effect at these points, as well as preventing the side arms 12 and 13 from engaging one another.

As the belt passes around a pulley its ends 1 and 2 tilt into the position shown in Figure 8. As the belt emerges from the pulley and enters the straight run of its path, the ends straighten out and the assembly takes on the appearance of Figure 1. This constant tilting and untilting cause a corresponding partial rotation of the bearing pin 21 within the bearing bushing 15. The bearing engagement is made smooth and with minimum friction by means of the lubricant contained within the bearing bushing 15. The simple and durable structure dispenses with the relatively rocking pintle members of previous belt connecters. The securing, to prevent rotation, of the bearing members to the side arms of their respective belt clips may be accomplished by other means than those shown, such as by splining the outside of the bearing bushing 15, making it polygonal, flattening it off, or by using keys, pins, set screws or other suitable means without departing from the scope of this invention. The bearing pin 21 may also be of hollow or tubular construction.

To lighten the weight of the moving parts the bearing pin shown in Figure 11 has been provided. This bearing pin 26 is provided with a bore 27 extending therethrough, thus reducing the weight thereof without reducing the bearing area, yet without materially reducing its strength because of the tubular construction thereof.

Figures 12, 13 and 14 show modified means of securing the bearing bushings to their respective belt connecter arms. In Figure 12 the bearing bushing 28 is provided with a flattened portion 29 along one side thereof. This flattened bearing bushing fits into apertures of corresponding outline in the belt connecter arm 12. Figure 13 shows a bearing bushing 30 having a splined outer surface consisting of alternate ridges 31 and depressions 32. This splined bearing bushing likewise fits into apertures of corresponding outline in the belt connecter arms. Figure 14 shows a bearing bushing 33 having a plurality of flattened sides 34. The type shown forms a hexagon, although other forms are within the scope of the invention.

The bearing bushing 35, shown in Figure 15, is of the oilless type and is surrounded by a sleeve 36 of harder metal, such as steel. The sleeve 36 is secured within apertures of corresponding outline in the belt connecter arms 12, and fixed in position in any one of the ways previously described. By this means the arms are prevented from biting into the comparatively soft bearing bushing metal by the presence of the steel sleeve 36. The latter thus supports the bearing bushing throughout its entire length. The bearing pin 20 in each of Figures 12, 13, 14 and 15 may be secured in any one of the foregoing ways, or it may be anchored to its belt connecter arm 13 in the manner shown in Figures 16 and 17. In this modification each end of the bearing pin 37 is provided with a pair of slots 38. The bearing pin 37 is secured in position by forming indentations 39 immediately adjacent the slots, thereby forcing metal portions 40 into the slots 38.

The belt connecter shown in Figures 18 to 20 comprises belt clips 41 and 42, similar to the belt clips 10 and 11 and having similarly interextending arms 43 and 44. Secured within the apertures 45 in the belt connecter arms 43 is the outer race 46 of needle bearings 47. The inner race of the needle bearings 47 comprises a bearing pin 48 secured within an aperture 49 in any of the previously described ways. In the form shown, the ends of the bearing pin 48 are provided with notches 50, and the arms 44 are provided with indentations 51 immediately adjacent these notches 50, thereby forcing metal from the arms into the notches and clinching the bearing pin 48 to the belt connecter arms 44. The needle bearings 47 comprise minute rollers of hardened steel of small diameter, a convenient diameter being about one-sixteenth of an inch, or less. The bearing race 45 and bearing pin 48 are likewise of hardened steel. The sides of the belt connecter arms 43 and 44 are beveled, as at 52 and 53, respectively, (Figure 20) in order to provide additional clearance between the belt connecter arms and the walls of the pulley groove.

The modified form of belt connecter shown in Figures 21 and 22 is similar to that shown in Figures 18 to 20, except that the bearing pin or inner race 54 is provided with reduced diameter ends 55, seated in reduced diameter apertures 56 in the belt connecter arms 44. By this means the belt connecter arms may be given a greater amount of bevel at the points 57 and 58 for greater clearance between the pulley groove walls and the belt connecter. At the same time, however, a very large diameter bearing pin 54 is provided. This form of bearing pin is assembled by bending the arms 44 inwardly to engage the reduced end portions 55 of the bearing pin 54. The ends 55 of the bearing pin 54 are clinched to the belt connecter arms 44 by the provision of notches 59. Indentations 60 made in the belt connecter arms 44 force metal therefrom into these notches 59, and anchor the bearing pin 54 securely to the belt connecter arms 44.

We desire to comprehend within our invention such modifications as may be embraced within the claims and the scope of the invention.

Having thus fully described the invention, what we claim as new and desire to secure by Letters Patent, is:

1. A belt connecter comprising a pair of belt clips having interlacing side arms, a bearing bushing having means on its ends interengaging with the side arms of one belt clip for locking said bushing to said side arms, portions of said ends extending beyond each side arm to form thrust extensions adapted to engage the side arms on the opposite belt clip, and a bearing pin mounted in said bearing bushing and having its ends secured to the side arms of the other belt clip.

2. A belt connecter comprising a pair of belt clips having interlacing side arms, said arms having bores therethrough, a bearing bushing secured at its ends in the bores in one pair of side arms, said bushing having indentations and said side arms having projections adapted to enter said indentations to lock said bushing to said side arms, and a bearing pin within said bushing secured at its ends within the bores of the other pair of side arms.

3. A belt connecter comprising a pair of belt clips having interlacing side arms, said arms having bores therethrough, a bearing bushing secured at its ends in the bores in one pair of side arms, said bushing having indentations and said side arms having projections adapted to enter said indentations to lock said bushing to said side arms, and a bearing pin within said bushing secured at its ends within the bores in the other pair of side arms, the ends of said bearing pin having indentations and the side arms engaging said bearing pin having corresponding projections extending within said indentations.

ABRAHAM L. FREEDLANDER.
NORMAN J. RITZERT.